United States Patent [19]

Sword et al.

[11] 3,904,819

[45] Sept. 9, 1975

[54] HIGH VOLTAGE SUPPLY CIRCUITS

[75] Inventors: Geoffrey Sword; John Leslie Lawrence; Stephen Richard Raggett, all of Fareham; Bernard Blakemore, London, all of England

[73] Assignee: Colourvision Associates, London, England

[22] Filed: Feb. 8, 1974

[21] Appl. No.: 440,703

[30] Foreign Application Priority Data

Feb. 9, 1973 United Kingdom ................. 6429/73
Feb. 9, 1973 United Kingdom ................. 6439/73

[52] U.S. Cl. ......... 178/7.5 R; 178/DIG. 11; 315/411

[51] Int. Cl.$^{2}$ ............................................ H04N 5/44

[58] Field of Search ...... 179/7.1, DIG. 11; 307/150; 328/258, 267; 178/7.3 R, 7.5 R; 315/27 TD, 411, 397; 325/492

[56] References Cited

UNITED STATES PATENTS

| | | | |
|---|---|---|---|
| 3,560,650 | 2/1971 | Hofmann | 178/7.5 R |
| 3,569,621 | 3/1971 | Krug | 178/7.5 R |
| 3,641,267 | 2/1972 | Cavallari | 325/492 X |

FOREIGN PATENTS OR APPLICATIONS

| | | | |
|---|---|---|---|
| 4,526,165 | 4/1966 | Japan | 178/DIG. 11 |

*Primary Examiner*—Richard Murray
*Assistant Examiner*—Aristotelis M. Psitos
*Attorney, Agent, or Firm*—Robert F. O'Connell

[57] ABSTRACT

High voltage supply circuits for television apparatus. The current in a primary circuit of a transformer is determined by a transistor the impedance of which is controlled by negative feedback from a high voltage output coupled to the secondary circuit of the transformer. Current pulses in the primary are produced by switching another transistor in the primary circuit at television line frequency. The circuit can be employed to supply a dynode resistor chain of a photomultiplier in a flying spot colour television transmitter, the luminance signal being averaged by a long time constant integrating circuit and summed with the negative feedback to provide a further feedback control compensating for variation in the average density of film being scanned.

7 Claims, 4 Drawing Figures

HIGH VOLTAGE SUPPLY CIRCUITS

BACKGROUND OF THE INVENTION

This invention relates to high voltage supply circuits and particularly to control circuits for use in television apparatus.

In the operation of television transmitting apparatus, a spacially and temporarily varying pattern of light is converted into an electrical signal whose instantaneous value is representative of the luminance of a spot in the pattern of light. This signal is known as a luminance signal. In monochrome television apparatus, this electrical signal can be produced directly by an opto-electrical device such as television camera tube, for example, an emitron. Although a luminance signal can be produced directly for colour television apparatus, in the system of colour television used in the United Kingdom, the luminance signal is produced by combining, in predetermined proportions, three electrical signals known as the tristimulus signals. The three tristimulus signals are respectively representative, by their instantaneous values, of the intensity of red, blue and green light emanating from a spot in the pattern of light.

Many television broadcasts are prerecorded on film, which may be either monochrome or colour film, and it is found that the quality of films vary considerably. One variation from film to film which is troublesome for television broadcasting is variation of overall image density. This type of variation can also occur within one film, sections of the film having different overall image density.

SUMMARY OF THE INVENTION

According to one aspect of the present invention there is provided a high voltage supply circuit in which two input terminals are coupled to a primary winding of a transformer through a controllable impedance device and a bipolar junction transistor, the controllable impedance device having a control terminal coupled to a high voltage output terminal through negative feedback means, the said output terminal being coupled to a secondary winding of the said transformer, and the bipolar junction transistor having its base coupled to means for supplying thereto a switching signal capable of switching the bipolar junction transistor from its non-conducting state into its fully conducting state and vice versa. The said controllable impedance device may be a further bipolar junction transistor, and the said means for supplying a switching signal may include a further transformer having a secondary circuit including the base-emitter junction of the first said bipolar junction transistor, and a primary circuit including a switching device and the said impedance device.

According to another aspect of the present invention there is therefore provided a control circuit for use in television apparatus, the control including variable gain means for producing a luminance signal, means for producing a control signal representative of the average value of the luminance signal over a predetermined averaging time, and a controllable gainsetting signal source coupled to be controlled by the said control signal and to determine the gain of the said variable gain means by supplying thereto a gain-setting signal, the circuit being such that the gain-setting signal substantially maintains the average value of the luminance signal at a reference value.

The variable gain means may be, for example, one or more photomultipliers in a flying-spot scanner. In a preferred embodiment of the invention, the variable gain means is a set of three photo-multipliers, each photomultiplier having a respective dynode resistor chain for setting voltages on its respective dynodes, and the gain of each photomultiplier being determined by the voltage across the respective dynode resistor chain. During operation the photomultipliers produce respectively three tristimulus signals −R, −G and −B which are supplied to a summing amplifier which produces the luminance signal by adding the tristimulus signals together in predetermined proportions. The luminance signal is then supplied to a delay circuit and the delayed luminance signal is supplied to a voltage doubling and averaging circuit which, in this embodiment, constitutes the means for producing a control signal representative of the average value of the luminance signal over a predetermined averaging time. A regulated supply circuit which supplies the voltage across the dynode resistor chains of the three photomultipliers constitutes the controllable gain-setting signal source of this embodiment. The regulated supply circuit has a control signal input terminal to which the control signal is supplied in operation and determines the value of the output voltage supplied by the regulated supply circuit. It is arranged that any change in the average value of the luminance signal over the averaging time produces a change in the control signal such that the output voltage applied to the dynode resistor chains changes so as to return the average value of the luminance signal to a predetermined reference value.

Preferred embodiments of the present invention will now be described in more detail with reference to the accompanying drawings.

DETAILED DESCRIPTION OF THE PREFERRED EMBODIMENTS

Figure 1:
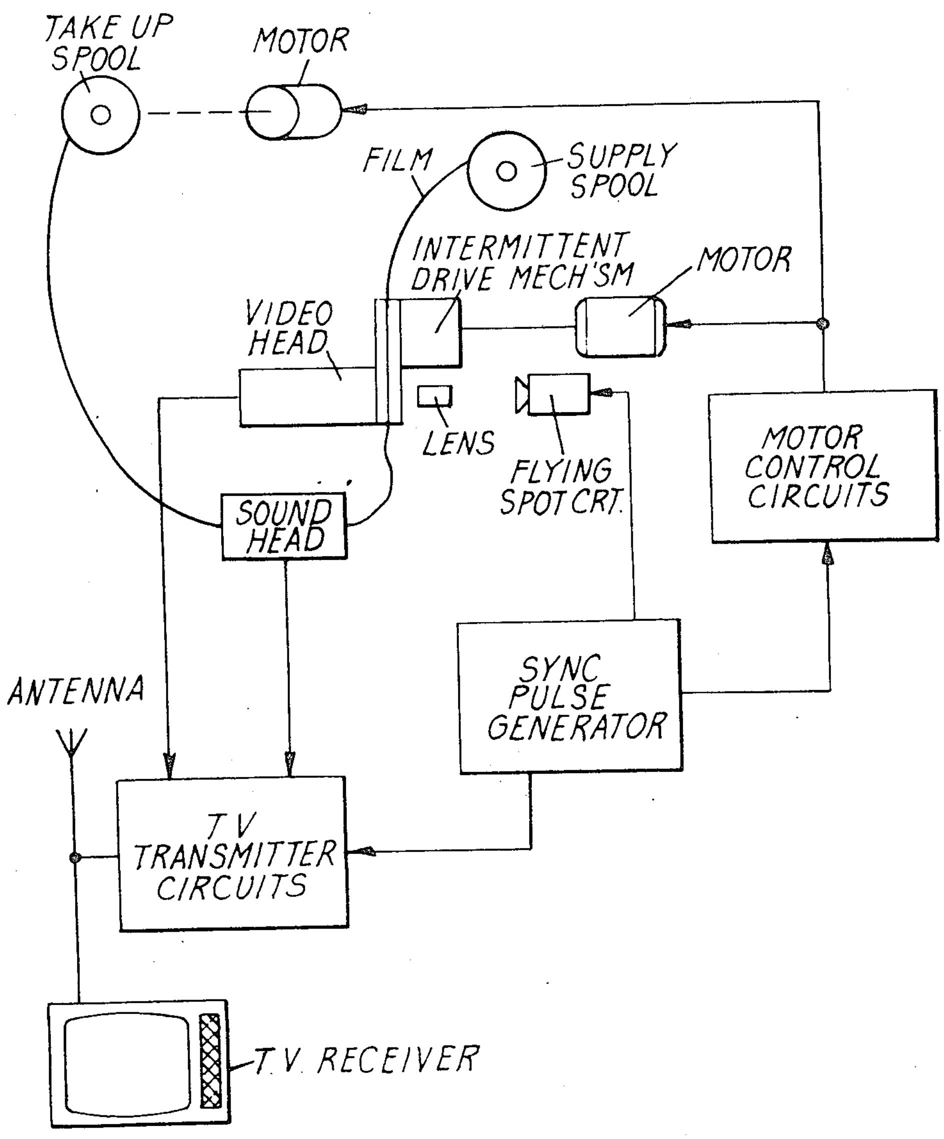
FIG. 1 is a block diagram of a flying spot television scanner apparatus including circuits according to the present invention.

A novel flying spot television scanner apparatus embodying the present invention will now be described with reference to FIG. 1 of the accompanying drawings. In FIG. 1 there is shown a television transmitter apparatus coupled by a transmission line such as a coaxial cable to an antenna and a television receiver. Where the transmitter apparatus is intended to broadcast a programme via the antenna, the coupled receiver may be a transmission monitoring receiver. Alternatively, the apparatus of FIG. 1 may be intended primarily as a cable television system, the transmission antenna being disconnected or replaced by a receiving antenna for the individual receiver and the receiving antenna may be disconnected when the receiver is being supplied by the transmitter apparatus, or may remain connected if there is no risk of interference from signals in the channel of frequencies transmitted by the transmitter apparatus.

The transmitter apparatus includes a flying spot receiver with a film transport mechanism including a driven take-up spool and a driven intermittent drive mechanism of the invention. A first d.c. electric motor controlled by motor control circuits is coupled through, for example, conventional reduction gearing to drive the take-up spool, and a second d.c. electric motor controlled by the motor control circuits is coupled through, for example, conventional reduction gearing to drive the intermittent drive mechanism. The film transport mechanism also includes a film gate through which film from a supply spool is drawn by the intermittent drive mechanism to pass before a video head and through a sound head before winding on to the take-up spool. Conventional mechanical details of the film transport which will be obvious to those skilled in the art will, for clarity, not be described herein. The motor control circuits are preferably as described and claimed in the copending application entitled "Control Apparatus for Electric Motors" by Geoffrey Sword, John L. Lawrence, Stephen R. Raggett and Bernard Blakemore and filed on the same day as the present application.

The scanner includes a flying spot cathode ray tube controlled by a synchronizing pulse generator. Such arrangements are described in The Focal Enclycopedia of Film & Television Techniques published in 1969 by The Focal Press, London and New York, at pages 817 to 845. Synchronizing pulse generators are described in the aforesaid Focal Encyclopedia at page 811.

In operation a television field raster is produced on the screen of the cathode ray tube, and the light from the scanning spot constituting this raster is focussed by a lens or lens system to form an image of the raster or a picture area of a frame of the film in the film gate. The video head may be a conventional monochrome television video head incorporating a single photomultiplier and suitable optical elements for focussing light from the illuminated picture on to the sensitive area of the photomultiplier, thereby producing in operation a video signal which is supplied by the video head to the composite video signal forming portion of television transmitter circuits, the output of the synchronizing pulse generator likewise being supplied thereto in known manner for the production in the transmitter circuits of a composite video signal. If the transmitter apparatus is intended to transmit colour television signals, and the colour system is the NTSC system, the transmitter circuits and synchronizing pulse generator may be as described in Principles of Colour Television by The Hazeltine Laboratories Staff, published in 1956 by John Wiley & Sons, Inc., Library of Congress Catalogue Card Number 56-8693. Where the colour system is the PAL system, the transmitter circuits and synchronizing pulse generator may be as described in PAL Color Television by G. Boris Townsend, published by the Syndics of the Cambridge University Press, London and New York, in 1970, Library of Congress Catalogue Card Number 76-96102. Further detached circuitry can be found in Colour Television, Volume 1 and 2 by P. S. Carnt and G. B. Townsend, published in 1961 and 1969 respectively by Iliffe Books, Ltd., London, and Principles of PAL Colour Television and Related Systems, by H. V. Sims, published in 1969 by Iliffe Books, Butterworth & Co. (Publishers) Ltd., London and Toronto.

Figure 2:
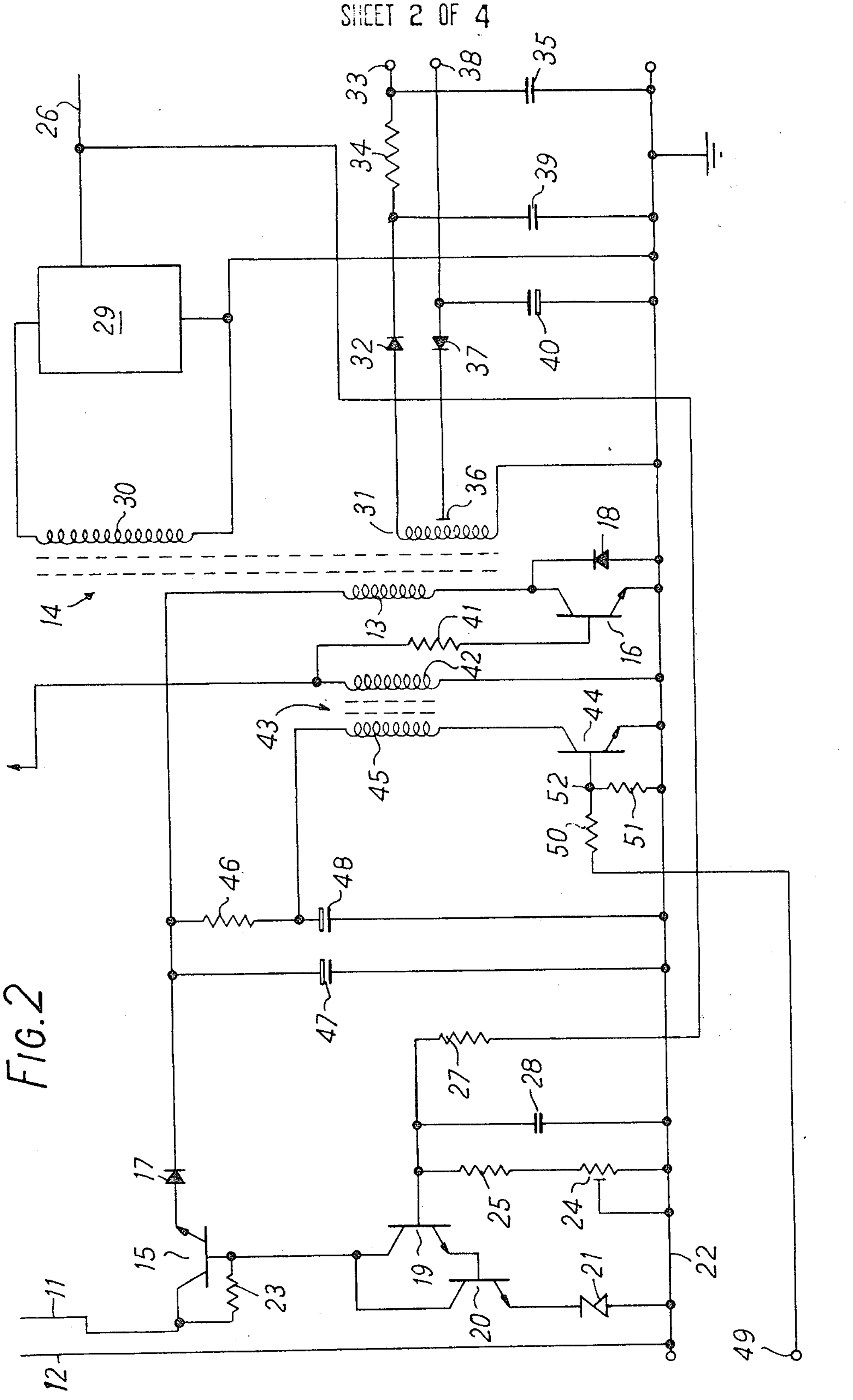
FIG. 2 is a circuit diagram of a first embodiment of the invention.

FIG. 2 shows the circuit of an embodiment of the invention in which a pair of circuit current input terminals 11 and 12 are coupled to the primary winding 13 of a transformer 14 through a controlled impedance element in the form of an NPN transistor 15 and a controlled switching device also in the form of an NPN transistor 16. The emitter of the transistor 15 is coupled through a diode 17 to one end of the primary winding 13, and a diode 18 has its anode connected to the emitter of the transistor 16 and its cathode connected to the collector of the transistor 16 and, jointly therewith, to the other end of the primary winding 13.

The diodes 17 and 18 serve to protect respectively the transistors 15 and 16 from reverse biasing voltages.

In operation, the transistor 16 is switched on and off so that pulsating currents are set up in the primary winding 13. These currents are rapidly damped to extinction unless current is supplied through the diode 17. The amount of current supplied through the diode 17 is determined by the impedance presented by the transistor 15 between its emitter and its collector. This impedance is controlled by the base current of the transistor 15 which is determined in turn by the collector voltage of two further NPN transistors 19 and 20 connected as a Darlington pair, their collectors being connected to the base of the transistor 15, and the emitter of the transistor 20 being coupled through a Zener diode 21 serving as a constant voltage source and having its anode connected to a common ground rail 22 to which the terminal 12 is connected.

The base of the transistor 15 is coupled to the input terminal 11 through a resistor 23 through which current is, in operation, supplied to the base of the transistor 15 and to the collectors of the transistors 19 and 20. Hence the voltage across the resistor 23 and therefore at the base of the transistor 15 is dependent upon the collector current drawn by the Darlington pair transistors 19 and 20.

The collector current of the Darlington Pair is controlled by a variable resistor 24 connected in series with a fixed resistor 25 between the ground rail 22 and the base of the transistor 19 and by a positive high voltage produced by the circuit in operation at an output terminal 26 which is coupled to the base of the transistor 19 through a feedback resistor 27. A smoothing capacitor 28 is connected in parallel with the resistors 24 and 25.

The terminal 26 is provided by the output terminal of a rectifier and voltage tripler unit 29 connected to be supplied from a secondary winding 30 of the transformer 14 which has one end thereof connected to the ground rail 22.

The transformer 14 has another secondary winding 31 having one end connected to the ground rail 22 and the other end connected to the anode of a diode 32, an output terminal 33 at which a lower positive high voltage appears being coupled to the cathode of the diode 32 through a resistor 34 and coupled to the ground rail 22 through a smoothing capacitor 35. Another smoothing capacitor 39 couples the cathode of the diode 32 to the rail 22.

The winding 31 has a centre tap 36 connected to the cathode of a diode 37 of which the anode is connected to a further output terminal 38 and is coupled to the ground rail 22 through a smoothing capacitor 40. A lower negative high voltage appears at the terminal 38 in operation.

The base of the transistor 16 is coupled through a resistor 41 and a secondary winding 42 of a transformer 43 in series with one another to the ground rail 22. The transistor 16 is switched on by current pulses from the winding 42 which are produced by switching on and off another NPN transistor 44 having its emitter connected to the ground rail 22 and its collector coupled through a primary winding 45 of the transformer 43 and a resistor 46 in series therewith to the cathode of the diode 17 from which the transistor 44 is supplied with collector current. Smoothing capacitors 47 and 48 couple the ends of the resistor 46 respectively to the ground rail 22.

A switching pulse input terminal 49 is coupled to the ground rail 22 through a voltage divider consisting of two resistors 50 and 51 connected in series and having their common junction point 52 connected to the base of the transistor 44. Positive-going switching pulses are supplied to the terminal 49 in operation so that the transistor 44 is switched into full conduction during each such pulse and is non-conducting between the pulses. Thus at each pulse, current is drawn through the primary winding 45 and induces a current in the secondary winding 42 which in turn renders the transistor 16 fully conductive. The resultant induced currents in the secondary windings 30 and 31 of the transformer 14 are rectified by the unit 29 and the diodes 32 and 37 and provides the desired high voltages at the output terminals 26, 33 and 38.

If the current in the primary winding 13 increases above a reference value, the voltage at the terminal 26 increases, thereby increasing the current drawn by the Darlington pair and therefore decreasing the voltage at the base of the transistor 15 so that the transistor 15 becomes less conductive and the current in the primary winding 13 is decreased. If the current in the primary winding 13 decreases below the reference value, a reverse action takes place resulting in the current in the primary winding 13 being increased.

Figure 4:
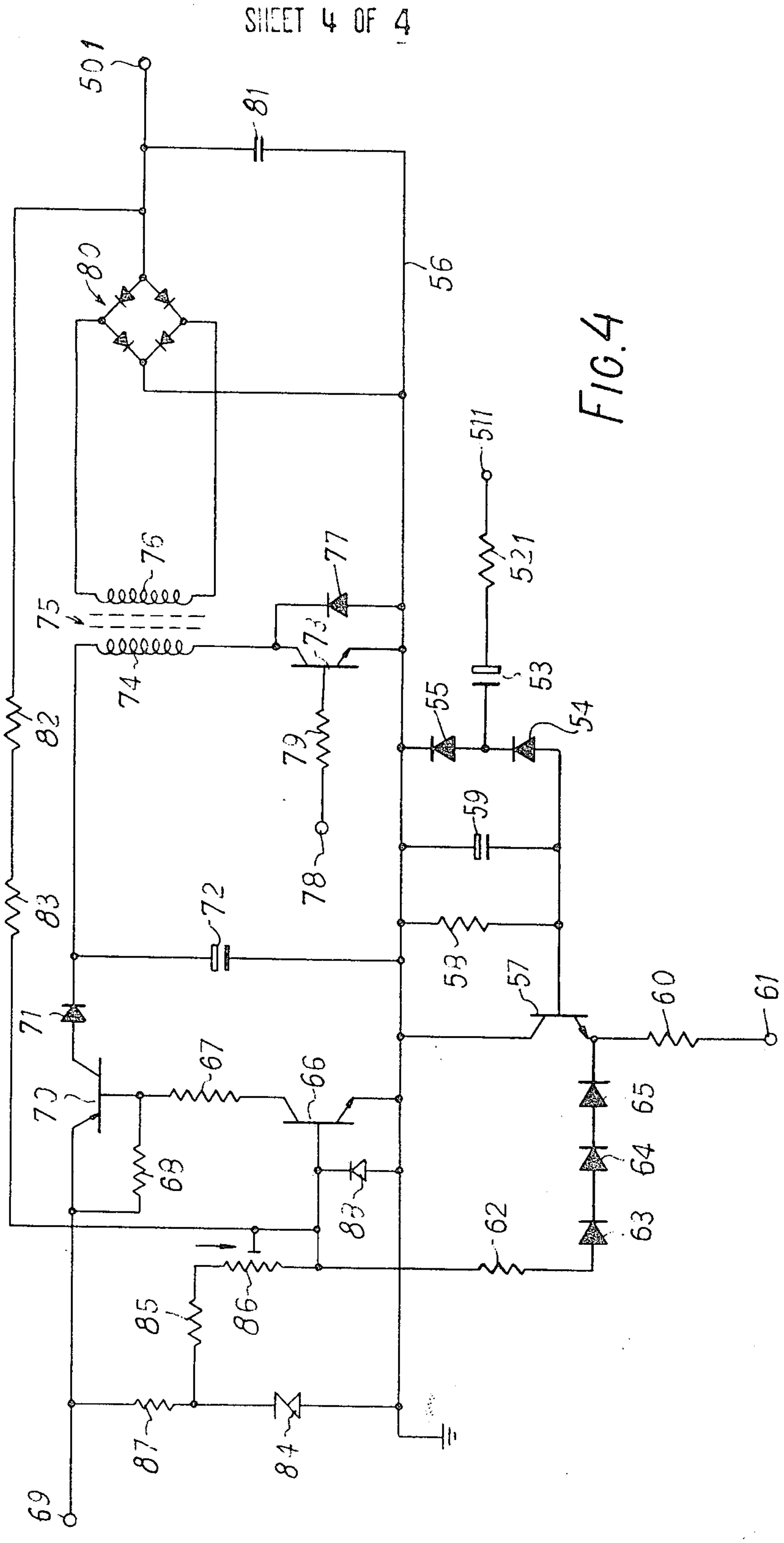
FIG. 4 is a circuit diagram of another embodiment of the invention.

In an embodiment constructed in accordance with FIG. 2, the transformers 14 and 43 have ferrite cores, and the end of the secondary winding 42 connected to the resistor 41 is also connected to the corresponding resistor 79 of a similar high voltage supply circuit shown in FIG. 4.

In the said constructed embodiment, the various items of the circuit have the following designations or values:

| Item | Type or Value |
|---|---|
| transistor 15 | TIP31A |
| transistors 19 and 20 | 2N3053 |
| transistor 44 | BF257 |
| transistor 16 | BLY49A |
| Zener diode 21 | IS2082 |
| diode 17 | IOD1 |
| diode 18 | IOD10 |
| diode 32 | LTVG10 |
| diode 37 | IOD10 |
| transformer 14 core | FX2940 and FX2507 |
| primary winding 13 | 50 turns 24 SWG |
| secondary winding 30 | 2000 turns 37½ SWG |
| secondary winding 31 | 420 turns 37½ SWG |
| transformer 43 core | FX2240 |
| primary winding 45 | 150 turns 325 SWG |
| secondary winding 42 | 22 turns 22 SWG |
| unit 29 | TUM25 |
| capacitor 28 | 0.047 microfarads |
| capacitor 47 | 100 microfarads, 63 volt electrolytic |
| capacitor 48 | 10 microfarads, 63 volt electrolytic |
| capacitor 40 | 1 microfarad, 400 volt electrolytic |
| capacitor 39 | 0.1 microfarad, 1 kilovolt |
| capacitor 35 | 0.1 microfarad, 1 kilovolt |
| resistor 23 | 2.2 kilohmns |
| resistor 25 | 120 kilohmns |
| resistor 24 | 100 kilohmns maximum |
| resistor 27 | 200 megohmns |
| resistor 46 | 82 ohmns |
| resistor 50 | 220 ohmns |
| resistor 51 | 220 ohmns |
| resistor 41 | 10 ohmns |
| resistor 34 | 22 kilohmns |

In operation, this constructed embodiment is supplied with positive-going pulses at a television line frequency of 15,625 Hertz at the terminal 49, and a D.C. supply of +50 volts at the terminal 11, and provides +13 kilovolts at the terminal 26, +700 volts at the terminal 33, and −150 volts at the terminal 38. These output voltages are suitable for supplying respectively to the anodes and grid of the cathode ray tube of the flying spot scanner of FIG. 1, the terminal 33 being connected to the final anode and anodes $A_2$ and $A_3$, the terminal 33 being connected to the anode $A_1$ and through a variable attenuator to the anode $A_3$, and the terminal 38 being connected to the grid.

Figure 3:
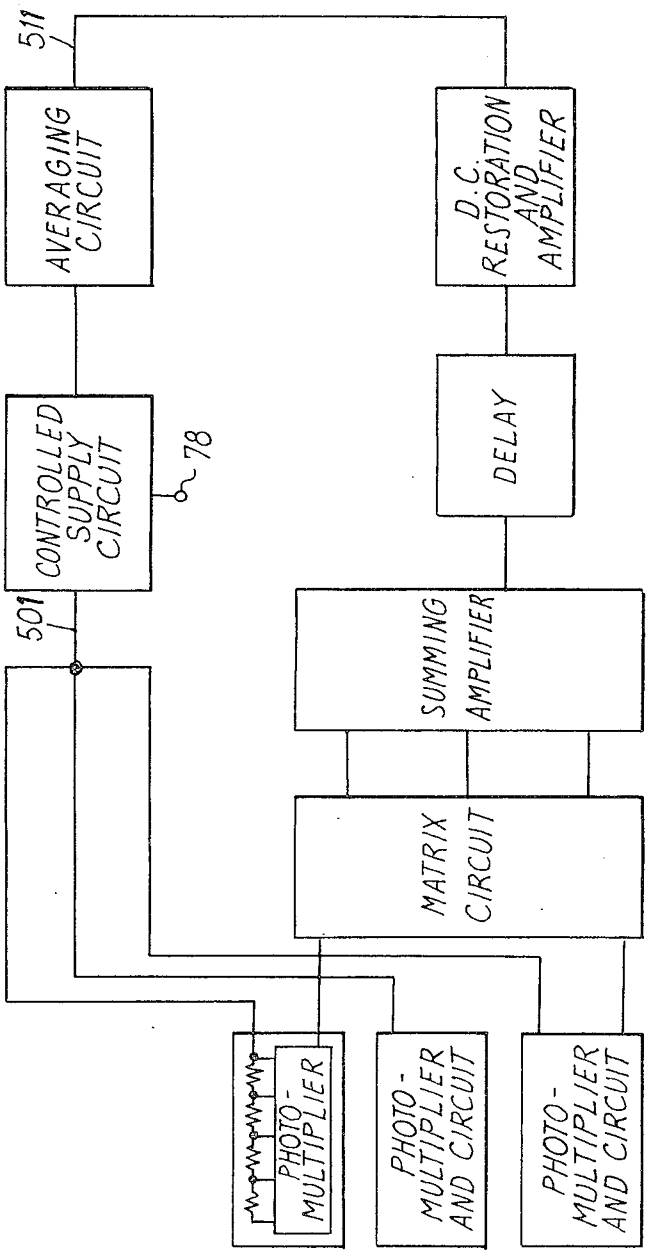
FIG. 3 is a block diagram in more detail of part of FIG. 1.

FIG. 3 shows in more detail part of the flying spot television scanner apparatus of FIG. 1 including the video head and stages in the TV transmitter circuits. The video head is suitable for colour television and includes three photomultiplier tubes for red, green and blue light separated in the video head by a dichroic optical system not shown. Each photomultiplier has a chain of resistors known as a dynode chain which acts as a voltage source for the dynodes of the photomultiplier as described on page 440 of the Encyclopaedic Dictionary of Electronics and Nuclear Engineering by Robert I. Sarbacher, published by Sir Isaac Pitman & Sons, Ltd., London and Prentice-Hall Inc. N.J. in 1959, Library of Congress Catalogue Card Number 59-11990. One end of the dynode chain is supplied with a high voltage from an output terminal 501 of a controlled supply circuit, shown in detail in FIG. 4, having an input terminal 78 for switching pulses at television line frequency, and a further input terminal to receive the output of an averaging circuit. An input terminal 511 of the averaging circuit is supplied through a delay circuit and a d.c. restoration and amplifier circuit with the output luminance signal of a summing amplifier which receives three tristimulus input signals representing red, green and blue from a matrix circuit having supplied thereto the output signals of the three photomultipliers. The matrix circuit may be of conventional form for correcting interdependence of the photomultiplier output signals and therefore will not be described further. The summing amplifier, delay and d.c. restoration and amplifier circuits are known stages in the coder of the T.V. transmitter circuits.

FIG. 4 is a circuit diagram of a regulated power supply circuit with a luminance signal averaging input stage.

The drawing shows a supply circuit for the high voltage end of respective dynode resistor chains provided for setting voltages on the respective dynodes of three photomultipliers which supply the input signals —R, —G and —B to a colour television transmitter. The low voltage end of the said resistor chains are connected to ground. The said high voltage is a negative direct voltage which appears in operation at the output terminal 501 of FIGS. 3 and 4.

A d.c.-restored luminance signal is supplied to the terminal 511 of of FIGS. 3 and 4 which is coupled through a resistor 521 in series with a capacitor 53 to the common point of connection of the cathode of a diode 54 with the anode of a diode 55 having its cathode connected to a ground rail 56. The anode of the diode 54 is connected to the base of an NPN transistor 57. A resistor 58 having a stabilising capacitor 59 in parallel therewith couples the base of the transistor 57 to the ground rail 56. The collector of the transistor 57 is connected to the ground rail 56, and the emitter of the transistor 57 is coupled through a resistor 60 to a −12 volt negative supply terminal 61. The diode 55 conducts whenever the voltage at its anode tends to become more positive than threshold voltage of the diode 15 relative to the ground rail 56, and the diode 54 conducts whenever the voltage at the cathode of the diode 54 tends to become more negative than the threshold voltage of the diode 54 relative to the voltage at the base of the transistor 57. Thus the combination of the capacitors 53 and 59 and the diodes 54 and 55 acts as a voltage doubler with respect to the mean value of the voltage at the terminal 511 taken over a short time determined by the values of the resistance of the resistors 521 and 58 and the capacitance of the capacitors 53 and 59. The transistor 57 acts as an emitter follower. One end of a resistor 42 is coupled to the emitter of the transistor 57 through three diodes 63, 64 and 65 connected cathode-to-anode in series, the anode of the diode 63 being connected to the said end of the resistor 66, and the cathode of the diode 65 being connected to the emitter of the transistor 57.

The anode of the diode 63 is coupled through the resistor 62 to the base of an NPN transistor 68 having its emitter connected to the ground rail 56 and its collector coupled through two resistors 67 and 68 connected in series with one another to a +50 volts supply terminal 69. The common point of connection of the resistors 67 and 68 is connected to the base of a PNP transistor 70 having its emitter connected to the supply terminal 69 and its collector connected to the anode of a diode 71. A capacitor 72 is connected between the cathode of the diode 71 and the ground rail 56. An NPN transistor 75 has its emitter connected to the ground rail 50 and its collector connected to one end of a primary winding 74 of a ferrite cored transformer 75 having a secondary winding 76. The other end of the primary winding 74 is connected to the cathode of the diode 71, and a diode 77 has its anode connected to the emitter and its cathode connected to the collector of the transistor 73.

In operation pulses at a television line frequency of 15.625 kilohertz are supplied from the sync pulse generator of the transmitter to the terminal 78 of FIGS. 3 and 4 coupled through a resistor 79 to the base of the transistor 73. Pulsating current at 15.625 kilohertz flows between the primary winding 74 and the capacitor 72 through the transistor 73 and the diode 77, the said line frequency pulses switching the transistor 73 on and off at this frequency. The induced current in the secondary winding 76 is rectified by a bridge 80 of four diodes so arranged that whichever end of the secondary winding 76 is positive is coupled to the ground rail 56, and whichever end of the secondary winding 76 is negative is coupled to the output terminal 501. A smoothing capacitor 81 is connected between the terminal 501 and the ground rail 56. Feedback from the output terminal 501 to the base of the transistor 66 is provided through two resistors 82 and 83 connected in series therebetween.

The said pulsating currents which pass through the primary winding 74 are rapidly damped to extinction unless current is supplied through the diode 71. The amount of current supplied through the diode 71 is determined by the impedance presented by the transistor 70 between its emitter and its collector. This impedance is controlled by the base current of the transistor 70 which is determined in turn by the collector current of the transistor 66, and hence by the base current of the transistor 66. This base current is determined by the voltage at the terminal 10, which is negative, the zener voltage of a zener diode 84, which is positive, and the voltage at the emitter of the transistor 57, which is negative. These voltages are summed at the base of the transistor 66 in proportions determined by the relative values of the resistors 62, 82, 83, a fixed resistor 85, and a variable resistor 86. The resistors 85 and 86 are connected in series with one another and couple the cathode of the zener diode 84 to the base of the transistor 66. The positive supply terminal 69 is coupled to the cathode of the zener diode 84 through a resistor 87, and the anode of the zener diode 84 is connected to the ground rail 86.

A diode 88 having its anode connected to the emitter of the transistor 66 and its cathode connected to the base thereof protects the base-emitter junction of the transistor 66 against reverse bias breakdown.

The values of the resistors 82, 83, 86, 85 and 87, and of the zener voltage of the diode 84 set the voltage at the terminal 501 at a predetermined normal value when the voltage at the anode of the diode 63 is at an expected normal value. When the voltage at the anode of the diode 63 changes from this expected normal value, as a result of the average transmission of light to the photocathodes of the said photomultipliers being greater than normal, negative feedback occurs since the voltage at the terminal 501 responds by changing in a direction which results in the average value of the voltage at the terminal 511 returning to the normal value which may be referred to as the reference value, associated with the said expected normal value at the anode of the diode 63. In other words, the system gain between the terminal 501 and the anode of the diode 63 is positive, and the gain through the circuit shown between the terminal 501 and the anode of the diode 63 is negative. This is so because the change in voltage at the terminal 501 resulting from a change in the voltage at the emitter of the transistor 57 causes a change in the respective gains of the three photomultipliers, and this change of gain results in the average value of the voltage at the terminal 511 returning to its normal value.

The circuit described with reference to FIG. 4 is combined with the circuit described with reference to FIGS. 2 by connecting the terminal 78 to one end of the secondary winding 42 of the transformer 43. In such a combined arrangement, the transistor 73 is a type BLY 49A NPN transistor and there is a corresponding transistor of the same type which is controlled in the same manner from the said secondary winding in the circuit.

We claim:

1. High voltage supply circuitry comprising;

transformer means;

primary winding means in said transformer means;

controllable impedance means coupled to said primary winding means, and having control terminal means;

bipolar junction transistor switching means coupled to said primary winding means;

high voltage output circuit means coupled to said transformer; and negative feedback means coupled to said control terminal means.

2. Supply circuitry as claimed in claim 1, wherein said controllable impedance means comprises further bipolar transistor means.

3. Supply circuitry as claimed in claim 1, further comprising further transformer means having secondary winding means coupled to the base-emitter junction of said transistor switching means.

4. Supply circuitry as claimed in claim 3, wherein said further transformer means has primary winding means coupled to further switching means and to said controllable impedance means.

5. Supply circuitry as claimed in claim 4, wherein said controllable impedance means comprises a bipolar junction transistor.

6. Supply circuitry as claimed in claim 1, further comprising;

variable gain means for producing a television luminance signal;

averaging means for producing a control signal representative of the average value of said luminance signal over a predetermined averaging time;

coupling means coupling said averaging signal to said controllable impedance means; and further coupling means coupling said high voltage output circuit means to control said variable gain means.

7. Supply circuitry as claimed in claim 6, wherein said variable gain means comprises a plurality of photomultiplier means coupled through summing amplifier means to said averaging means.

* * * * *